(12) United States Patent
Khoshkava et al.

(10) Patent No.: US 10,510,225 B2
(45) Date of Patent: Dec. 17, 2019

(54) BENDABLE ELECTRONIC DEVICE APPARATUS AND METHODS

(71) Applicant: IMMERSION CORPORATION, San Jose, CA (US)

(72) Inventors: Vahid Khoshkava, Montreal (CA); Mansoor Alghooneh, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/996,248

(22) Filed: Jun. 1, 2018

(65) Prior Publication Data

US 2018/0276959 A1 Sep. 27, 2018

Related U.S. Application Data

(63) Continuation of application No. 15/395,409, filed on Dec. 30, 2016, now Pat. No. 10,037,660.

(51) Int. Cl.
*G08B 6/00* (2006.01)
*G06F 3/01* (2006.01)

(52) U.S. Cl.
CPC ............ *G08B 6/00* (2013.01); *G06F 3/016* (2013.01)

(58) Field of Classification Search
None
See application file for complete search history.

(56) References Cited

U.S. PATENT DOCUMENTS

| 10,037,660 B2* | 7/2018 | Khoshkava | B06B 1/045 |
| 2008/0001484 A1 | 1/2008 | Fuller et al. | |
| 2014/0132375 A1* | 5/2014 | Sawaguchi | H02K 33/02 335/274 |
| 2014/0265650 A1* | 9/2014 | Jeon | H02K 33/16 310/25 |
| 2016/0093457 A1* | 3/2016 | Jang | H01H 50/18 335/185 |

FOREIGN PATENT DOCUMENTS

EP 1429299 A1 6/2004

OTHER PUBLICATIONS

Extended European Search Report for European Application No. 17210213.9 dated May 17, 2018, 6 pages.

* cited by examiner

*Primary Examiner* — Leon Viet Q Nguyen
(74) *Attorney, Agent, or Firm* — Miles & Stockbridge P.C.

(57) ABSTRACT

A flexible haptic actuator and corresponding method. The flexible haptic actuator comprises a core formed with a flexible material. The core defines a volume and is bendable. An electrical conductor is coiled around the core and is bendable. A casing surrounds the electrical conductor and at least a part of the core. The casing includes a plurality of flexible sections and a plurality of stiff sections. The casing is bendable. A haptic mass is suspended in the volume, the haptic mass being at least partially formed with a magnetic material. The haptic mass is movable in the volume in response to the electrical conductor generating a magnetic field.

20 Claims, 7 Drawing Sheets

US 10,510,225 B2

BENDABLE ELECTRONIC DEVICE APPARATUS AND METHODS

CROSS-REFERENCE TO RELATED APPLICATIONS

This application is a continuation application of U.S. patent application Ser. No. 15/395,409, filed Dec. 30, 2016, the entire contents of which are incorporated herein by reference.

TECHNICAL FIELD

This patent document relates to haptic actuators, and more particularly to flexible haptic actuators.

BACKGROUND

Haptic effects are used to enhance the interaction of an individual with an electronic device. Haptic effects enable the user to experience a touch sensation, which is typically generated by an actuator embedded in the device. Recent innovations have enabled the development of electrical devices that are foldable or otherwise bendable such as foldable and bendable displays, cell phones, tablets, and other devices. Additionally, haptic devices may be embedding or attached to wearable articles such as clothing, jewelry, and wrist bands. They also may be embedded in or attached to fabrics and other bendable and foldable devices and things.

A problem with embodying haptic devices in these types of device and things is that the haptic actuator can limit their ability to bend or fold. Furthermore, even if the haptic actuator folds or bends with the device, the bending action can impede the operation of the haptic device and limit its ability to vibrate or otherwise deliver a haptic effect.

SUMMARY

One aspect of this patent document relates to a flexible haptic actuator comprising a core formed with a flexible material. The core defines a volume and is bendable. An electromagnetic coil is coiled around the core and is bendable. A casing surrounds the electrical conductor and at least a part of the core. The casing includes a plurality of flexible sections and a plurality of stiff sections. The casing is bendable. A haptic mass is suspended in the volume, the haptic mass being at least partially formed with a ferromagnetic material. The haptic mass is movable in the volume in response to the electromagnetic coil generating a magnetic field.

Another aspect of this patent document is a method of generating a haptic effect using a haptic actuator having an electromagnetic coil wrapped around the volume, and a haptic mass suspended in the volume. The method comprises deforming the haptic actuator; conducting an alternating electric current through the coil; in response to conducting the alternating electric current, generating a magnetic field extending through the volume; and in response to the generating the magnetic field, moving the haptic mass within the volume while the haptic actuator is deformed, the moving haptic mass having an oscillating path of travel.

DETAILED DESCRIPTION

Figure 2:
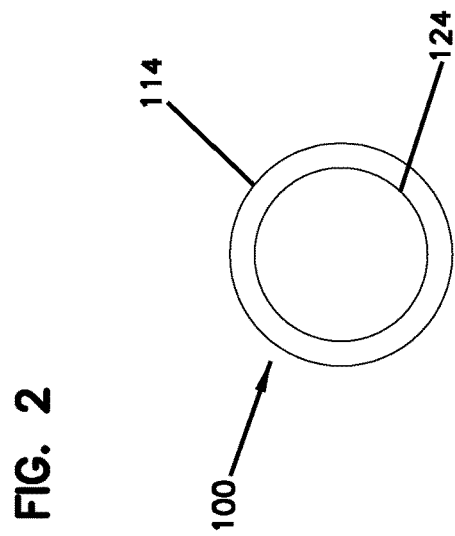
FIG. 2 is an end view of the flexible haptic actuator shown in FIG. 1.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In general terms, this patent document relates to haptic actuators that can bend and still deliver a haptic effect. Additionally, a haptic effect can be any type of tactile sensation delivered to a person. In some embodiments, the haptic effect embodies information such as a cue, notification, feedback or confirmation of a user's interaction with a haptic-enabled article or other notifications. In some embodiments, the haptic effect can embody a more complex message or other information. In alternative embodiments, the haptic effect can be used to enhance a user's interaction with a device by simulating a physical property or effect such as friction, flow, and detents.

Figure 1:
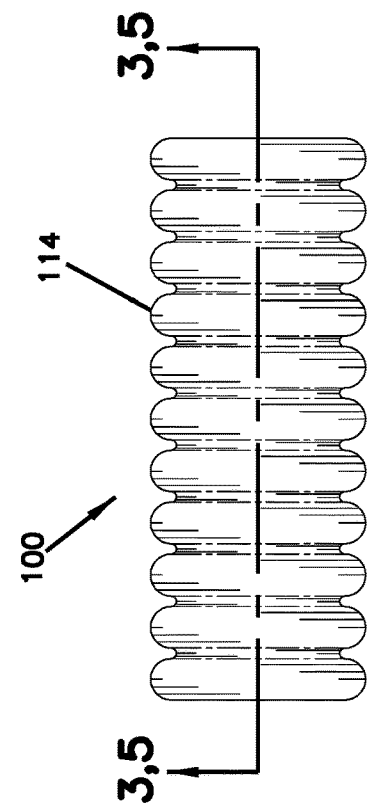
FIG. 1 is a top plan view of one possible embodiment of a flexible haptic actuator.
Figure 3:
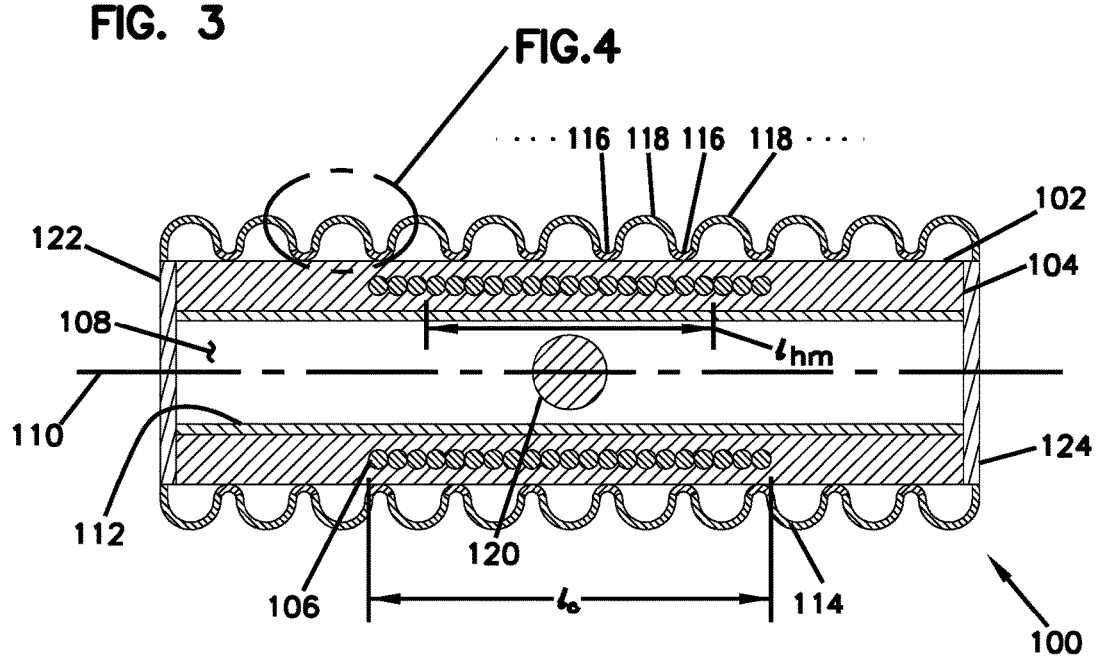
FIG. 3 is a cross-sectional view of the flexible haptic actuator shown in FIG. 1 taken along line 3-3.
Figure 4:
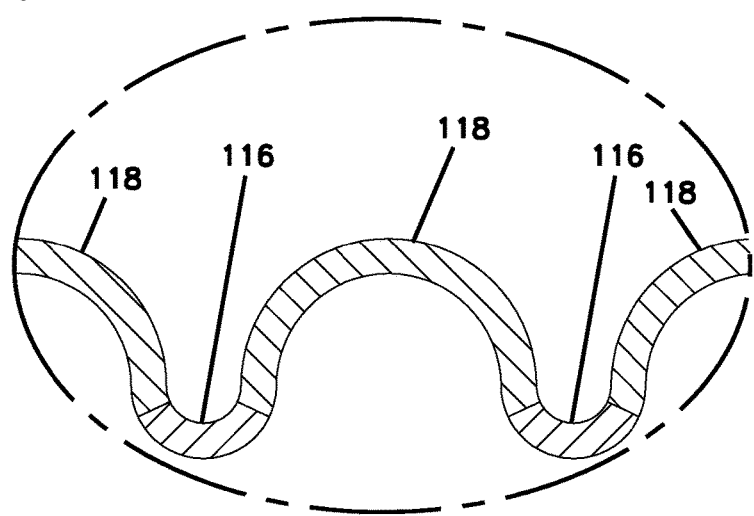
FIG. 4 is a break out of a portion of the haptic actuator shown in FIG. 1-3.

Referring now to FIGS. 1-3, a haptic actuator 100 has a core 102, electromagnetic coil 106, haptic mass 120, and casing 114. The haptic actuator 100 has an outer diameter in the range of about 5 mm to about 30 mm, although alternative embodiments can have a diameter smaller than 5 mm or greater than 30 mm. Additionally, the haptic actuator 100 has a length in the range of about 10 mm to about 60 mm, although alternative embodiments can have a length smaller than 10 mm or greater than 60 mm.

The core 102 has a substantially tubular wall 104 that defines a void 108 and has a centerline 110. The haptic mass 120 is positioned in the void 108. First and second end caps 122 and 124 are positioned proximal to the oppositely disposed ends of the tubular wall 104 and enclose the void 108.

The tubular wall 104 has a thickness in the range of about 1 mm to about 3 mm, although alternative embodiments can have an inner diameter less than about 1 mm or larger than 3 mm. The core 102 is formed with a material having a high magnetic permeability and guides the magnetic field radiating from the electromagnetic coil 106 so at least a portion of the field passes through the void 108 in a direction substantially parallel to the centerline 110 of the void 108. Additionally, the core 102 is formed with a flexible material, and in alternative embodiments, the core 102 is also formed with a material that can be stretched. In exemplary embodiments, the core 102 is formed with a ferromagnetic gel-like suspension or rubber material, although other materials and can be used to form the core 102. In alternative embodiments, the core 102 is formed with a material that is not magnetic or has a low permeability. Examples of materials that can be used to form the core 102 include elastomers such as polyacrylic, silicon, fluorosilicon, fluoroelastomer and polyurethane rubbers. In at least some embodiments, these elastomers can be imbedded with ferromagnetic particles.

The electromagnetic coil 106 is formed with a magnetic conductor wound around at least portion of the core 102. In at least some embodiments, the electromagnetic coil 106 is molded or otherwise embedded in the tubular wall 104 of the core 102 such as a spiral channel formed within the tubular wall 104 of the core 102 that is filled with an electrically conductive material. In alternative embodiments, the electromagnetic coil 106 can be wound around an outer surface of the tubular wall 104 or even along an inner surface of the tubular wall 104. Additionally, the electromagnetic coil 106 can be formed with any suitable electrical conductor such as a wire or an electrically conductive plating, trace, or layer. For wires, the wire can have a size in the range of about 30 gauge to about 40 gauge, although alternative embodiments can have a gauge above 40 gauge or below 30 gauge. The gauge of the wire can vary depending on a variety of design criteria including how strong a magnetic field is needed or desired; the size of the haptic mass; the permeability of the haptic mass; the desired performance characteristics for the haptic actuator such as velocity, acceleration, frequency of oscillation, and length of movement for the haptic actuator; and resistance against movement of the haptic mass especially when the flexible haptic actuator is bent. The gauge of the wire and characteristics of the electrical signal flowing through the electromagnetic coil 106 can be adjusted to optimize the magnetic field based on these and other criteria.

The electromagnetic coil 106 extends for a length, $l_c$, along the centerline 110, and the length, $l_c$, is about equal to the length, $l_{hm}$, of the path of travel for the haptic mass 120 in (discussed in more detail herein) within the void 108. In alternative embodiments, the length of the electromagnetic coil 106 can extend the entire length of the tubular wall 104 for the core 102. In other alternative embodiment, the length, $l_c$, of the electromagnetic coil 106 can be longer than the path of travel for the haptic mass 120, but less than the length of the core 102. Alternatively, the length, $l_c$, of the electromagnetic coil 106 can extend for the entire length of the core 102. The length, $l_c$, also can be somewhat shorter than the path of travel for the haptic mass 120 so long as the portion of magnetic field that radiates past the end points of the electromagnetic coil 106, or some other force, is able to control linear movement of the haptic mass 120 along the centerline 110. The length of the electromagnetic coil 106 also can depend on the size of the haptic mass and other design, and performance characteristics as discussed in more detail herein.

The haptic mass 120 is a mass that has a cross-sectional area that is at least slightly smaller than the cross-sectional area of the void 108 defined by the tubular wall 104 of the core 102. This sizing enables the haptic mass 120 to move along the centerline 110 of haptic actuator 100. The haptic mass 120 can have different shapes including spherical, cylindrical, or any other shape that allows it to move through the void 108 and along the centerline 110. Additionally, in at least some embodiments, the cross-sectional shape of the haptic mass 120 is the same as the cross-sectional shape of the inner surface of the core's tubular wall 104, although in some embodiments, they may have different shapes. However, an advantage of a spherical shape is that the spherical haptic mass 120 will not limit the bending action of the haptic actuator 100. Additionally, a spherical haptic mass 120 will not become skewed relative to the inner surface of the core's tubular wall 104 and thus not bind within the void 108 thus limiting its movement.

The haptic mass 120 can be made from a ferrous material that has a net magnetic moment that is either positive or negative so that it can be propelled when exposed to the magnetic field radiated from the electromagnetic coil 106. Additionally, the haptic mass 120 can be formed with a material that will have minimal friction relative to the core 102, or coating 112 applied to the surface of the core 102, to minimize resistance to movement of the haptic mass 120 in the event it moves against the core's tubular wall 104.

For example, the haptic mass 120 can be formed with an elastomeric material that is embedded with ferromagnetic particles. The ferromagnetic particles can be Nano particles, although larger particles can be used. Examples of elastomeric materials or other materials that can be used to form the haptic mass 120 include silicone, polyacrylic, fluorosilicon, fluoroelastomer and polyurethane rubbers. Examples of material forming ferromagnetic particles include carbon iron, iron oxide and compounds containing nickel, iron or cobalt. In other possible embodiments, the haptic mass 120 is formed with only ferromagnetic material.

In exemplary embodiments, the void 108 is empty but for the haptic mass 120. In other exemplary embodiments the void 108 contains a gas. In yet other embodiments, the void 108 is filled with a flexible suspension that acts against movement of the haptic mass 120 and transmits force created by movement or vibration of the haptic mass 120. Examples of the flexible suspension include silicone gel, other gel-like materials, and foam. In other example embodiments, some of which are discussed in more detail herein, the void 108 contains a resilient physical structure or other type of structure that is operably connected to and interacts with the haptic mass.

A coating 112 for a material having magnetic properties is applied to the inner surface of the core's tubular wall 104. When exposed to a magnetic field, diamagnetic materials radiate an induced magnetic field having a direction opposite to the inducing magnetic field. Thus, when exposed to the ferromagnetic material in the haptic mass 120, the diamagnetic material will radiate an induced magnetic field that propagates toward the center of the haptic mass 120 and the centerline 110. Because the cross-sectional shapes of the inner surface of the tubular wall 104 and the haptic mass 120 are circular and concentric, the induced magnetic field radiating from the diamagnetic material exerts substantially equal and opposite forces against opposite sides of the haptic mass 120 and always urges the haptic mass 120 to stay centered on the centerline 110.

Additionally, the coating 112 can extend around less than the entire circumference of the core 102 so long as the coating 112 applies equal and opposite magnetic forces against the haptic mass 120 to urge it toward the centerline 110. For example, alternating arcs or segments around the circumference can be coated with the magnetic material.

In at least some possible embodiments, the coating 112 is formed with a diamagnetic material such as graphite, pyrolytic carbon, bismuth, mercury, silver, diamond carbon, lead, and copper. The coating 112 extends along the entire length and circumference of the tubular wall's 104 inner surface. Alternatively, the coating 112 can extend a length less than the length of the core 102, but still along a length of the tubular wall 104 that is equal to or greater than the path of travel for the haptic mass 120. In alternative embodiments, the coating 112 extends for a length shorter than the path of travel for the haptic mass 120. Additionally, the coating 112 is a material and applied with a technique such that the coating 112 will not be damaged as the haptic actuator 100, and hence the core 102, is bent, stretched, or compressed. In place of or in addition to the coating 112, a separate lining or other member having magnetic properties as described herein can be fitted into the void 108 to help center the haptic mass 120.

As an alternative to the coating, a sleeve (not shown) formed with a magnetic material may be inserted into the void 108 and line the inner surface of the tubular wall 104. The magnetic field radiating from the sleeve would levitate the haptic mass 120 in the void 108. The sleeve can have any suitable length that provides levitation to the haptic mass 120 as it moves within the void 108. For example, the sleeve could extend the entire length of the tubular wall 104. In another example, the sleeve is shorter than the tubular wall 104, but longer than the path of travel $l_{hm}$ for the haptic mass 120. In another example, the length of the sleeve is the same as or shorter than the path of travel $l_{hm}$ for the haptic mass 120, so long as the field radiating from the sleeve is able to support or levitate the haptic mass 102. In another alternative embodiment, magnetic pieces are place along the inner surface of the tubular wall 104 instead of, or in addition to, a sleeve. The magnetic pieces could be elongated and extend along the length of the tubular wall 104. Alternatively, the magnetic pieces could have other shapes and be placed in a pattern along the inner surface of the tubular wall 104 such that the pattern radiates a magnetic field or magnetic fields that interact with the haptic mass 120 and levitate it within the void 108 and along the entire path of travel $l_{hm}$. In yet other embodiments, a sleeve or individual magnetic pieces can be used in addition to the diamagnetic coating 112.

The casing 114 is fitted around the outer diameter of the core's tubular wall 104. The casing 114 can be a framework, housing, sleeve, or any other structure that provides flexibility and still protects against compression as described herein.

The casing 114 has a plurality of stiff segments formed with a stiff material and a plurality of flexible segments formed with a flexible material. In alternative embodiments, the material forming the flexible sections is also elastic so it can be stretched or compressed, in addition to being bent. The flexible segments enable the haptic actuator 100 to bend. The stiff segments provide rigidity that prevents compression of the core 102 and the cross-sectional area of the void 108 defined by the core's tubular wall 104. This structure enables the haptic actuator 100 to be bent (or compressed or stretched if the flexible material is elastic) with minimal or no restriction damping on movement of the haptic mass 120, and thus with minimal or no damping on vibration of the haptic mass 120.

In the illustrated embodiment, the casing 114 is corrugated and has a plurality of annular ridges 118 that are parallel to each other and extend around the circumference of the haptic actuator 100 and the core 102. In this exemplary embodiment, the annular ridges 118 form the stiff sections. The casing 114 also has a plurality of annular troughs 116 or flutes that are parallel to each other and parallel to the ridges 118. The troughs 116 extend around the circumference of the haptic actuator 100 and the core 102 and form the flexible sections. The ridges 118 and troughs 116 alternate along substantially the entire length of the core 102 and haptic actuator 100.

The ridges 118 and troughs 116 can have the same width to provide a uniform corrugation along the length of the haptic actuator 100. Alternatively, the ridges 118 can have a different width than the trough. In yet other embodiments, the widths of the ridges 118 can vary along the length of the haptic actuator 100. For example, the ridges 118 that are positioned radially from the path of travel for the haptic mass 120 can be wider than the ridges 118 along other portions of the haptic actuator 100 to provide greater protection against compression of the void 108 where the haptic actuator 100 is located. The widths of the trough also can vary along the length of the haptic actuator 100.

Additionally, the casing 114 can be made using a variety of different fabrication techniques. For example, the casing 114 can be molded around the core 102 with different materials inserted into different portion of the mold. In another example, the casing 114 can be printed using a 3D printer and different material. Additionally, the casing 114 can be formed separately from the rest of the haptic actuator 100 and then inserted over the core 102, much like a sleeve. In yet other embodiments, the ridges 118 and troughs can be formed separately and then bonded or otherwise attached to each other using an adhesive or just separately inserted over the core 102 and bonded thereto or to each other.

Although a corrugated structure is shown, the casing 114 can have any other structure that both provides flexibility and protects the core 102 and void 108 against compression. Additionally, the casing 114 can be a single piece or several pieces positioned along the haptic actuator 100 to provide both flexibility and protection against compression.

In operation an electrical current that oscillates between positive and negative flows through the electromagnetic coil 106 and generates a magnetic field, at least a portion of which propagates through the void 108. The magnetic field propels the haptic mass 120 along a path substantially parallel to the centerline 110. As the electric current changes polarity, the haptic mass 120 changes direction in the void 108. This back and forth movement of the haptic mass 120 causes the haptic actuator 100 to vibrate. Additionally, the coating 112 of magnetic material along the inner surface of the core's tubular wall 104 provides equal and opposing forces along the radius of the haptic mass 120, which urges the haptic mass 120 to a centered position on the centerline 110 and provides a gap between the haptic mass 120 and the tubular wall 104. If the haptic mass 120 moves off center and towards or even into contact with the core 102, the magnetic force propagating form the coating 112 to the haptic mass 120 urges the haptic mass 120 back into a centered position along the centerline 110.

Figure 5:
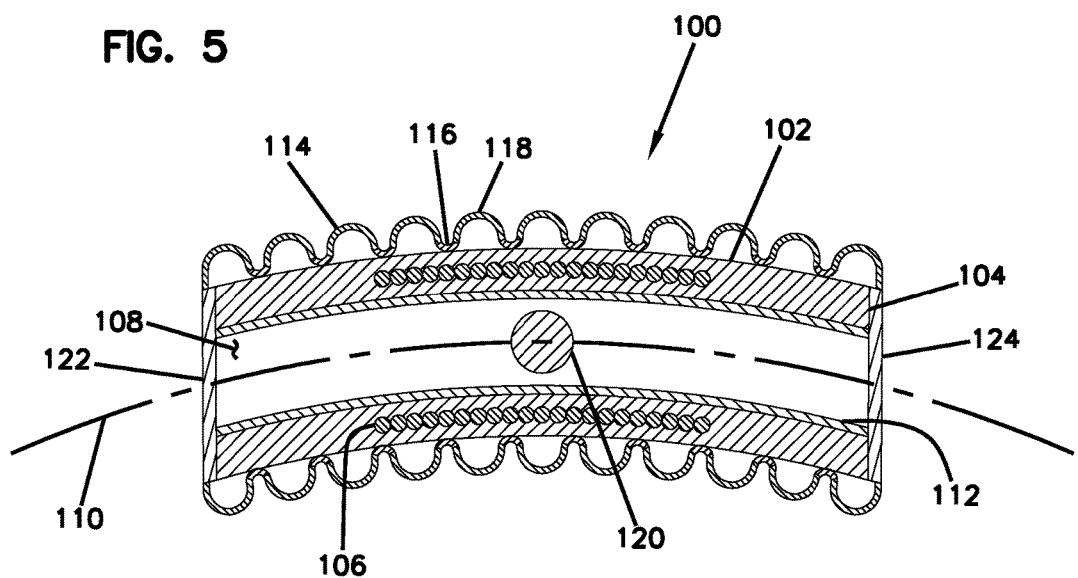
FIG. 5 is a cross-sectional view of the flexible haptic actuator shown in FIG. 1 taken along line 5-5 as the flexible haptic actuator is bent.

Additionally, when the haptic actuator 100 bends as illustrated in FIG. 5, the void 108 and the centerline 110 also bend and become curved. The bending action of the haptic actuator 100 also causes the core 102, electromagnetic coil 106, coating 112, and centerline 110 to bend. The direction that the magnetic field propagates as it radiates from the electromagnetic coil 106 also bends with the centerline 110 and causing the path of the haptic mass 120 to bend. As the haptic mass 120 moves along the curved path, momentum may cause it to strike the inner surface of the core 102 causing some damping on movement of the haptic mass 120 and damping on vibration of the haptic actuator 100. However, the magnetic interaction between the coating 112 the haptic mass 120 continually urges the haptic mass 120 toward the center line and away from the core 102 thus reducing or even minimizing contact between the haptic mass 120 and thus and this reducing or minimizing damping.

Figure 6:
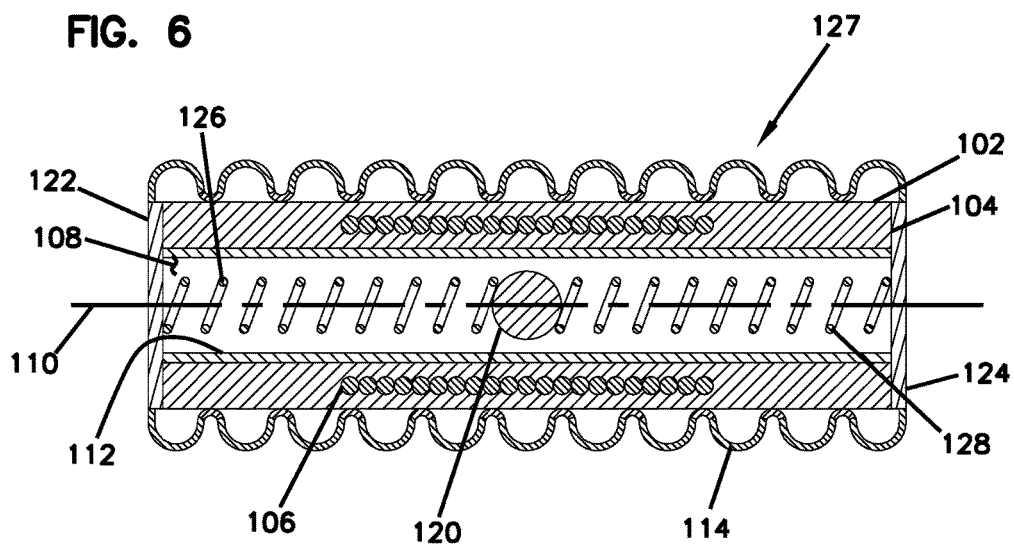
FIG. 6 is a cross-sectional view of an alternative embodiment of the haptic actuator shown in FIG. 1-5.

FIG. 6 illustrates an alternative embodiment of a haptic actuator 127 that is substantially similar to the haptic actuator 100 illustrated in FIGS. 1-4. The haptic actuator 127 has a core 102 that defines a void 108 and has a coating 112 of magnetic material on its inner surface, an electromagnetic coil 106, a haptic mass 120, and a casing 114.

In place of, or in addition to, the suspension filling the void 108, first and second springs 126 and 128 are positioned in the void 108. The first spring 126 extends between the first end cap 122 and the haptic mass 120, and the second spring 128 extends between the second end cap 124 and the haptic mass 120. The first and second springs 126 and 128 hold the haptic mass 120 along the centerline 110 when the haptic actuator 127 is in a non-actuated state (e.g., not vibrating) and also when it is in an actuated state (e.g., vibrating). The first and second springs 126 and 128 also are aligned with the centerline 110 and help hold the haptic mass 120 on the centerline 110 when a device in which the haptic actuator 127 is mounted moves or is jostled. An advantage of this two-spring configuration is that supporting both sides of the haptic mass 120 helps hold the haptic mass 120 in position centered on the centerline 110 so there is lower damping resulting from the haptic mass 120 moving off center and striking the inner surface of the core 102.

Figure 7:
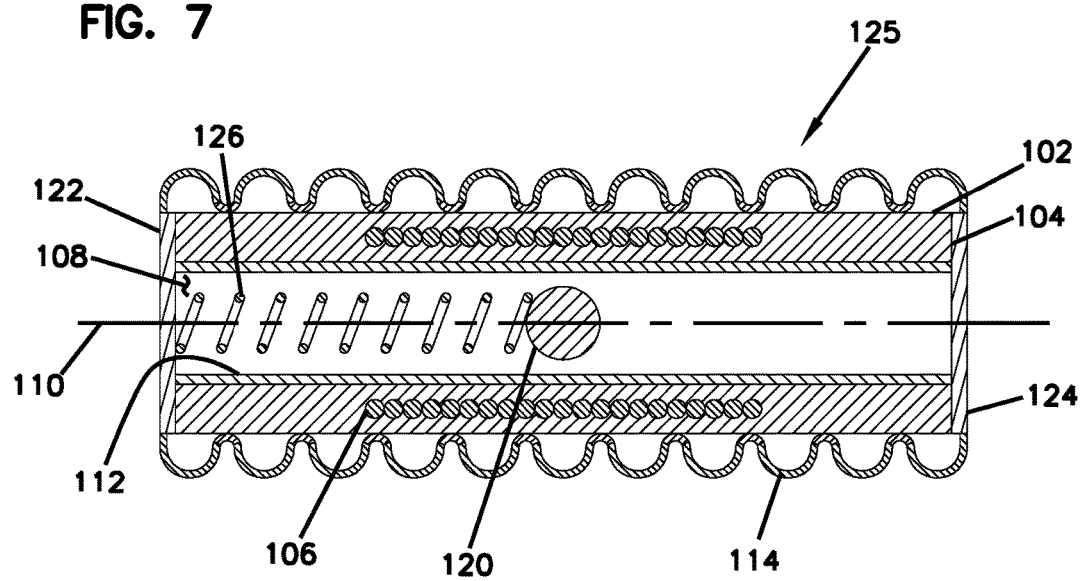
FIG. 7 is a cross-sectional view of an alternative embodiment of the haptic actuator shown in FIG. 1-5.

FIG. 7 illustrates an alternative embodiment of a haptic actuator 125 that is substantially similar to the haptic actuator 127 illustrated in FIG. 6. The haptic actuator 125 has a core 102, that defines a void 108 and has a coating 112 of magnetic material on its inner surface, an electromagnetic coil 106, a haptic mass 120, and a casing 114. In this embodiment, however, the haptic actuator 125 has a single spring 126 extending between one end cap 122 and the haptic mass 120. There is not a second spring between the opposite side of the haptic mass 120 and the opposite end cap 124.

An advantage of this embodiment is that the single spring configuration should have less damping on movement of the haptic mass 120 than the two spring configuration. With the single spring configuration, stretching or compressing the haptic actuator 125 will not extend or compress the spring 126 because the haptic mass 120 is not anchored on both sides. Accordingly, the amount of force needed to move the haptic mass 120 does not change as a result of the stretching or compressing of the haptic actuator 125.

For embodiments in which there are two springs anchored between opposite sides of the haptic mass 120 and opposite ends of the haptic actuator, stretching or compressing the haptic actuator will cause the springs to extend or compress, respectively. The resulting change in the length of the springs will result in more force being required to move the haptic mass 120 and thus have a damping effect on movement of the haptic mass 120 and vibration of the haptic actuator. As a result, a single spring arrangement is advantageous in that it result in lower damping of the haptic mass 120 and the haptic actuator 125.

Figure 8:
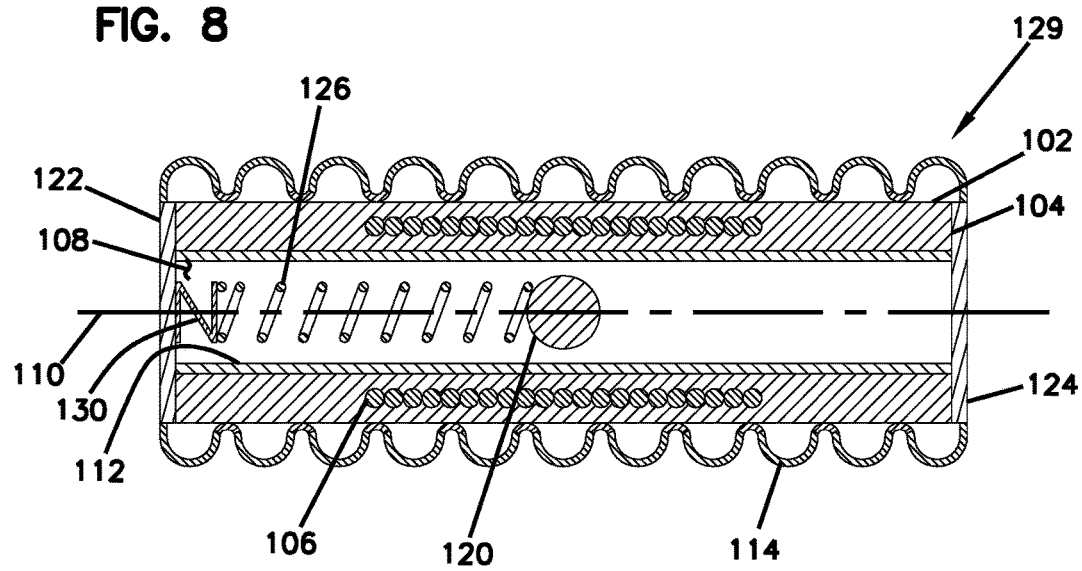
FIG. 8 is a cross-sectional view of an alternative embodiment of the haptic actuator shown in FIG. 1-5.

FIG. 8 illustrates an alternative embodiment of a haptic actuator 129 that is substantially similar to the haptic actuator 125 illustrated in FIG. 7. The haptic actuator 129 has a core 102, that defines a void 108 and has a coating 112 of magnetic material on its inner surface, an electromagnetic coil 106, a haptic mass 120, a spring 126, and a casing 114. Additionally, an articulating joint 130 is positioned between the end cap 122 and the spring 126. In an example embodiment, the articulating joint 130 can be a folded or origami type of structure. The articulating joint 130 further reduces any damping effect caused by the spring 126. For example, a spring 126 with one end fixedly anchored to the end cap 122 of the haptic actuator 129 will tend to bend a greater degree when the haptic actuator 129 is bent than if the one end has some give and is permitted to move relative to the end cap 122 and other structures of the haptic actuator 129.

Figure 10:
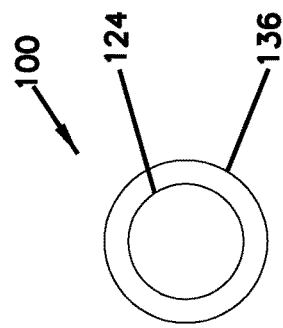
FIG. 10 is a side view of the flexible haptic actuator shown in FIG. 9.
Figure 9:
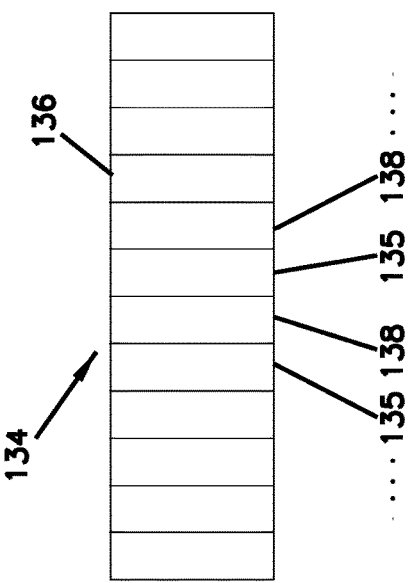
FIG. 9 is a top plan view of an alternative embodiment of the flexible haptic actuator shown in FIGS. 1-5.

FIGS. 9 and 10 illustrate another embodiment of a haptic actuator 134, which is substantially similar to the haptic actuator 100 illustrated in FIGS. 1-4. Haptic actuator 134 has a core 102, that defines a void 108 and has a coating 112 of magnetic material on its inner surface, an electromagnetic coil 106, and a haptic mass 120. In also includes a casing 136 that is similar to the casing 114 in that it extends around the circumference of the core 102, extends along the length of the haptic actuator 134, and has alternating and parallel sections formed with stiff material 138 and flexible material 135. However, the casing 136 is not corrugated and has a relatively smooth outer surface.

Figure 12:
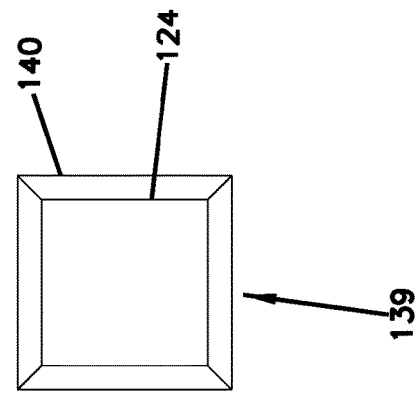
FIG. 12 is a side view of the flexible haptic actuator shown in FIG. 11.
Figure 11:
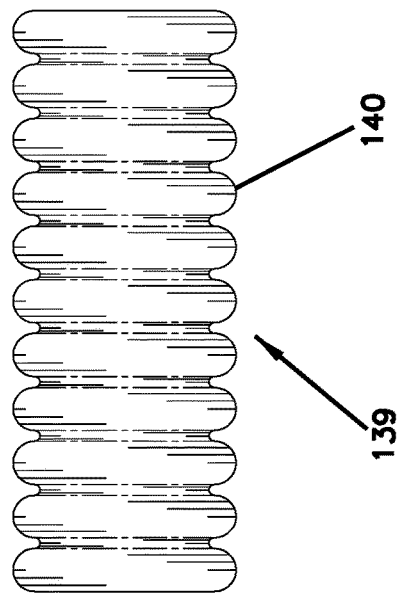
FIG. 11 is a top plan view of an alternative embodiment of the flexible haptic actuator shown in FIGS. 1-5.

FIGS. 11 and 12 illustrate another embodiment of a haptic actuator 138, which is substantially similar to the haptic actuator 100 illustrated in FIGS. 1-4. Haptic actuator 138 has a core 102, that defines a void 108 and has a coating 112 of magnetic material on its inner surface, an electromagnetic coil 106, and a haptic mass 120.

The haptic actuator 138 also includes a casing 140 that is corrugated and substantially similar to the casing 114, except the outer surface of a cross section for the casing 140 is square or otherwise rectangular shape. Although circular and rectangular shapes for the outer surface of the casing 140 are illustrated, the casing in alternative embodiments can have any shape and may be a shape other than circular or rectangular. Additionally, even though the outer surface of the casing 140 is not circular or annular, the electromagnetic coil 106, core 102, and void 108 can still be cylindrical and have a circular cross-section. Alternatively, the cross section of any component, including the electromagnetic coil 106, core 102, and void 108, can have a non-circular shape.

Figure 13:
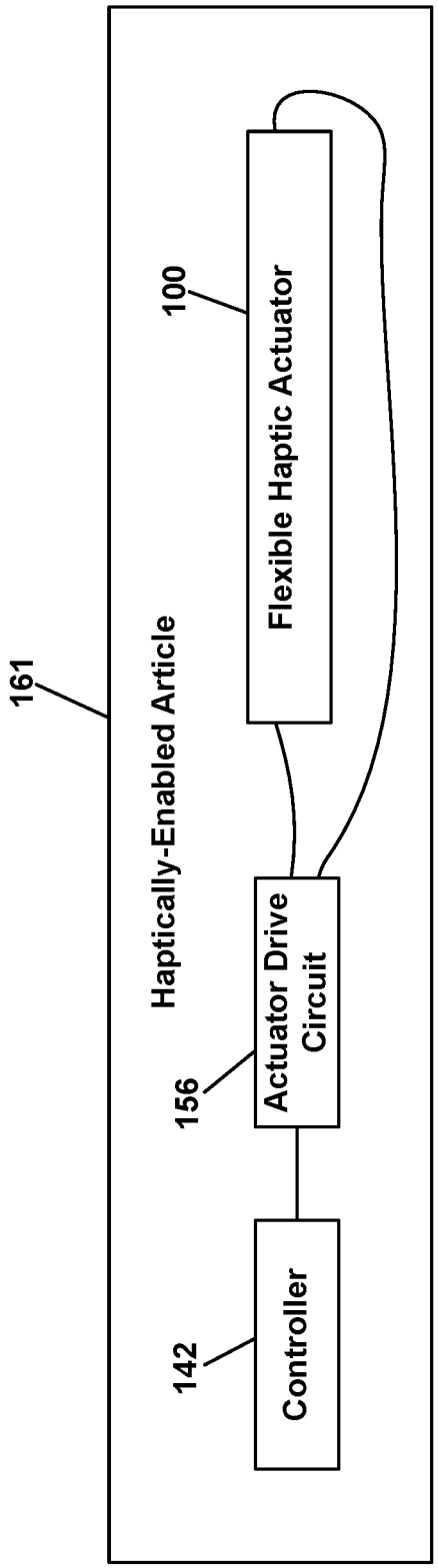
FIG. 13 is a block diagram illustrating a flexible haptic actuator as shown in any of the previous figures as it may be included in a haptically-enabled article.

FIG. 13 illustrates an embodiment in which the haptic actuator 100 shown in FIGS. 1 and 2 is positioned proximal in an article 161 such as an electronic device, wearable article, or any other article. A controller 142 and actuator drive circuit are electrically connected to the haptic actuator and can be located in the article 161 or remote from the article 161. As the haptic actuator 100 vibrates, it generates an inertial force that is transferred to the structures in the article 161. This transferred inertial force, in turn, causes the article 161 to also vibrate and deliver a haptic effect. The structures of the article 161 that are proximal to the haptic actuator 100 can be any structure such as the housing for an electronic device, a touch pad, a display screen, strap, or any other structure with which a user interacts. Examples of electronic devices include bendable and foldable devices such as straps; wearable articles such as belts, jewelry, wrist bands, and clothing; folding and bendable electronics such as foldable and bendable cellphones, foldable and bendable tablets, and foldable and bendable displays; wallets and purses; and other computers, tablets, eBook readers, phones such as smart phones, display screens, gaming consoles and controllers, virtual reality goggles and other virtual reality equipment, pointing devices, vehicles, automotive components, surgical instruments and other medical equipment and monitors, exercise equipment, safety equipment, and any other apparatus through which it is desired to deliver a haptic effect.

Figure 14:
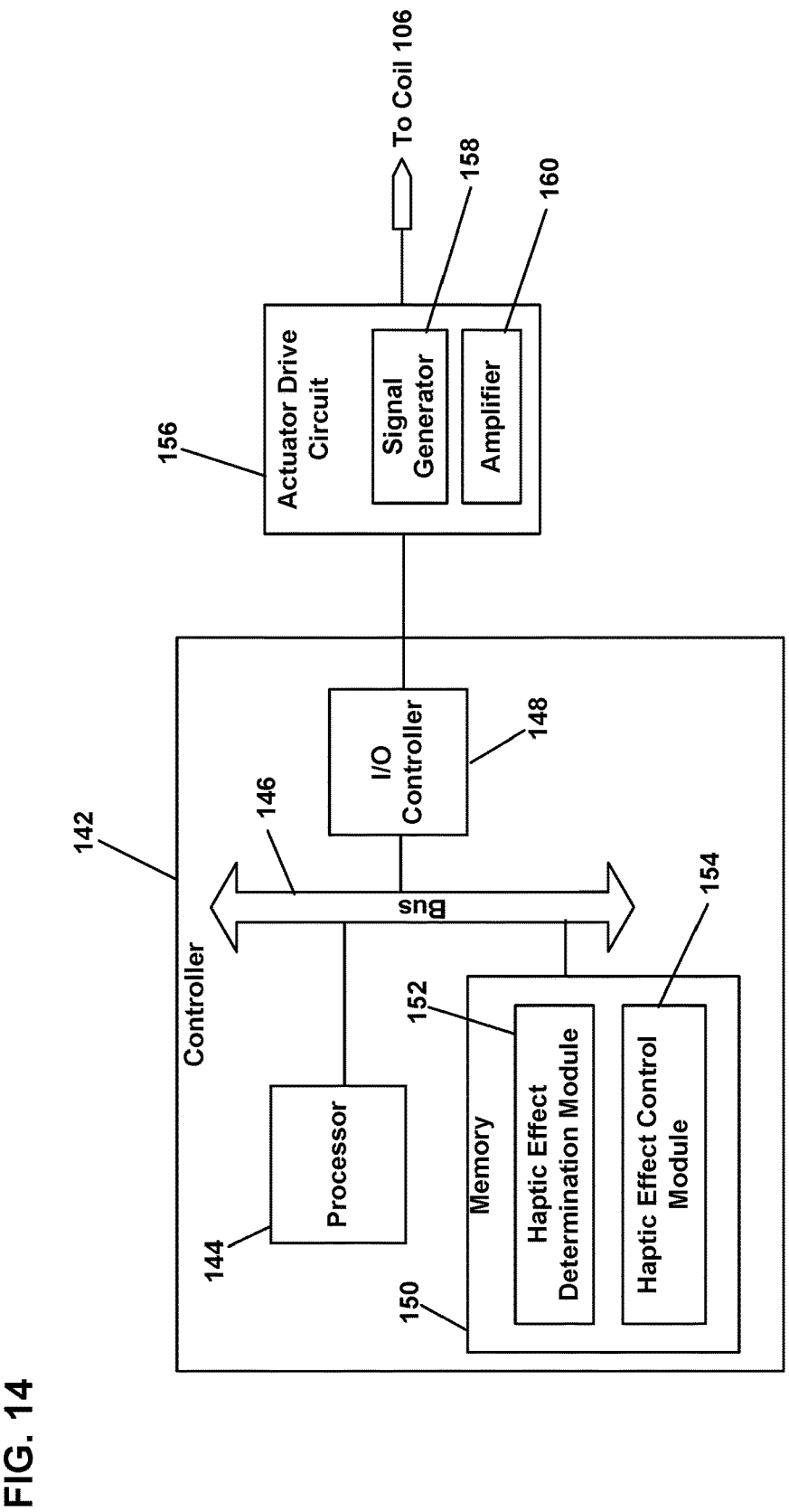
FIG. 14 is a block diagram of a controller for actuating the flexible haptic actuator show in any of the previous figures.

Referring to FIG. 14, a controller 142 for the haptic actuators disclosed herein includes a bus 146, a processor 144, an input/output (I/O) controller 148 and a memory 150. The bus 146 couples the various components of the controller 142, including the I/O controller 148 and memory 150, to the processor 144. The bus 146 typically comprises a control bus, address bus, and data bus. However, the bus 146 can be any bus or combination of busses suitable to transfer data between components in the controller 142.

The processor 144 can comprise any circuit configured to process information and can include any suitable analog or digital circuit. The processor 144 can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor 144 can comprise a single unit, or a combination of two or more units, with the units physically located in a single controller or in separate devices.

The I/O controller 148 comprises circuitry that monitors the operation of the controller 142 and peripheral or external devices. The I/O controller 148 also manages data flow between the controller 142 and peripherals or external devices (not shown). The external devices can reside in the same article or device in which the controller 142 and haptic actuator 100 are incorporated or can be external to the system. Examples of other peripheral or external devices with which the I/O controller 148 can interface include sensors, external storage devices, monitors, input devices such as keyboards, mice or pushbuttons, external computing devices, mobile devices, transmitters/receivers, and antennas.

The memory 150 can comprise volatile memory such as random access memory (RAM), read only memory (ROM), electrically erasable programmable read only memory (EEPROM), flash memory, magnetic memory, optical memory or any other suitable memory technology. The memory 150 can also comprise a combination of volatile and nonvolatile memory.

The memory 150 is configured to store a number of program modules for execution by the processor 144, including a haptic effect determination module 152 and a haptic effect control module 154. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller 142.

In an example embodiment, the haptic effect determination module 152 determines when to deliver a haptic effect. If the controller 142 is programmed to deliver different haptic effects, the haptic effect determination module 152 also determines which haptic effect to deliver. An example technique that the haptic effect determination module 152 can use to determine which haptic effect to deliver includes rules programmed to make decisions to select a haptic effect. For example, the controller 142 may interface with GPS receiver or other location tracking device and determine different haptic effects that should be delivered based on the user's location and whether they are moving.

Upon the haptic effect determination module 152 determining which haptic drive signal to deliver to the haptic actuator 100 and communicates that determination to the haptic effect control module 154. The haptic effect control module 154 obtains the electrical parameters, properties, or characteristics that correspond to the determined haptic effect. The haptic effect control module 154 communicates the electrical parameters to the controller 148, which outputs them to the actuator drive circuit 156. The actuator drive circuit 156 has a signal generator 158 in series with an amplifier 160, which then generate a haptic drive signal embodying the electrical parameters provided by the haptic effect control module 154. The actuator drive circuit 156 applies the haptic drive signal to the electrodes in the smart material fabrication 104 of the haptic actuator 100.

Examples of signal parameters that can be used to generate the haptic drive signal include frequency, amplitude, phase, inversion, duration, waveform, attack time, rise time, fade time, and lag or lead time relative to an event. Additionally, examples of signals and waveforms for the haptic drive signal include direct current signals, alternating current signals, square waves, sinusoidal waves, step signals, triangle waves, sawtooth waves, and pulses. Additionally, the haptic drive signal can have a voltage in the range from about 2 V to about 10 V, and an electrical current in the range of about 0.1 mA to about 0.5 mA. In alternative embodiments, the haptic drive signal can have a voltage below 2 V or above 10 V and a current below 0.1 mA or above 0.5 mA. The frequency of the haptic drive signal can be in the range from about 100 Hz to about 250 Hz. In alternative embodiments, the frequency can be below 100 Hz or above 250 Hz. In alternative embodiments, the haptic drive signal has a Voltage or frequency outside of these ranges. Additionally, the desired voltage and frequency of the haptic drive signal can vary depending on the structure of the actuator and the type of materials used in the actuators and the structure used to support the haptic mass 120 in the void 108.

In an alternative embodiment, there is no determination of the haptic effect to be delivered through the haptic actuator 100 or the electrical parameters to use for generating the haptic drive signal. In such an embodiment, the controller 142 is simply programmed, or even hard wired, to deliver a determined haptic drive signal to the haptic actuator 100.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A bendable electronic device comprising:
a flexible display coupled to a flexible haptic actuator, wherein the flexible haptic actuator includes:
- a core, the core being formed with a flexible material, the core defining a volume;
- an electromagnetic coil coiled around the core;
- a casing surrounding the electromagnetic coil and at least a part of the core, the casing including a plurality of flexible trough sections and a plurality of stiff ridge sections; and
- a haptic mass in the volume, the haptic mass at least partially formed with a ferromagnetic material, the haptic mass movable in the volume in response to the electromagnetic coil generating a magnetic field.

2. The bendable electronic device according to claim 1, wherein the flexible display is foldable.

3. The bendable electronic device according to claim 1, wherein the flexible material is elastic.

4. The bendable electronic device according to claim 3, wherein the plurality of flexible trough sections comprises an elastic material.

5. The bendable electronic device according to claim 1, wherein the casing includes flexible sections and stiff sections alternating along the casing.

6. The bendable electronic device according to claim 1, wherein the core comprises particles of a ferrous material.

7. The bendable electronic device according to claim 1, wherein the electromagnetic coil comprises a wire.

8. The bendable electronic device according to claim 1, wherein in response to the generating the magnetic field, the haptic mass is moved within the volume while the flexible haptic actuator is deformed, the haptic mass moving along an oscillating path of travel.

9. A method of generating a haptic effect on a bendable display, the method comprising:
deforming a flexible haptic actuator, the bendable display being coupled to the flexible haptic actuator; and
in response to generating a magnetic field, moving a haptic mass while the flexible haptic actuator is deformed,
wherein the flexible haptic actuator comprises:
- a core, the core being formed with a flexible material, the core defining a volume;
- an electromagnetic coil coiled around the core;
- a casing surrounding the electromagnetic coil and at least a part of the core, the casing including a plurality of flexible trough sections and a plurality of stiff ridge sections; and
- the haptic mass in the volume, the haptic mass at least partially formed with a ferromagnetic material.

10. The method according to claim 9, wherein the bendable display is foldable.

11. The method according to claim 9, wherein the flexible material is elastic.

12. The method according to claim 11, wherein the plurality of flexible trough sections comprises an elastic material.

13. The method according to claim 9, wherein the casing includes flexible sections and stiff sections alternating along the casing.

14. The method according to claim 9, wherein the core comprises particles of a ferrous material.

15. The method according to claim 9, wherein the electromagnetic coil comprises a wire.

16. The method according to claim 9, wherein in response to the generating the magnetic field, the haptic mass is moved within the volume while the flexible haptic actuator is deformed, the haptic mass moving along an oscillating path of travel.

17. A non-transitory computer readable storage medium storing a program configured to be executed by a processor, the program for generating a haptic effect on a bendable display, the program comprising instructions for:
deforming a flexible haptic actuator, the bendable display being coupled to the flexible haptic actuator; and
in response to generating a magnetic field, moving a haptic mass while the flexible haptic actuator is deformed,
wherein the flexible haptic actuator comprises:
- a core, the core being formed with a flexible material, the core defining a volume;
- an electromagnetic coil coiled around the core;
- a casing surrounding the electromagnetic coil and at least a part of the core, the casing including a plurality of flexible trough sections and a plurality of stiff ridge sections; and
- the haptic mass in the volume, the haptic mass at least partially formed with a ferromagnetic material.

18. The non-transitory computer readable storage medium of claim 17, wherein the bendable display is foldable.

19. The non-transitory computer readable storage medium of claim 17, wherein the flexible material is elastic.

20. The non-transitory computer readable storage medium of claim 17, wherein the casing includes flexible sections and stiff sections alternating along the casing.

* * * * *